United States Patent
Bennani et al.

(10) Patent No.: US 11,762,657 B2
(45) Date of Patent: Sep. 19, 2023

(54) INTELLIGENT PLATFORM FOR DOCUMENTATION AUTHORING AND PRODUCTION

(71) Applicant: SAP SE, Walldorf (DE)

(72) Inventors: Youssef Bennani, Levallois (FR); Sven Leukert, Walldorf (DE); Tina Haug, Walldorf (DE); Carsten Brennecke, Wiesloch (DE); Julia Moik, Weingarten (DE); Jean Maqueda, Paris (FR); Stephane Albucher, Herblay (FR); Joerg Stiehl, Gaiberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/411,739

(22) Filed: Aug. 25, 2021

(65) Prior Publication Data
US 2023/0062965 A1    Mar. 2, 2023

(51) Int. Cl.
*G06F 8/73*     (2018.01)
*G06F 40/51*    (2020.01)

(52) U.S. Cl.
CPC ............... *G06F 8/73* (2013.01); *G06F 40/51* (2020.01)

(58) Field of Classification Search
CPC .................................. G06F 8/73; G06F 40/51
See application file for complete search history.

(56) References Cited

U.S. PATENT DOCUMENTS

| | | | | |
|---|---|---|---|---|
| 2009/0222787 A1* | 9/2009 | Aldahleh | ............. | G06F 9/454 |
| | | | | 717/101 |
| 2011/0276939 A1* | 11/2011 | Frankin | ............. | G06F 8/71 |
| | | | | 717/101 |
| 2016/0034258 A1* | 2/2016 | Wijngaard | ............. | G06F 8/73 |
| | | | | 717/123 |
| 2020/0125353 A1* | 4/2020 | Bean | ............. | G06F 8/65 |
| 2020/0272428 A1* | 8/2020 | Katakam | ............. | G06F 9/542 |

OTHER PUBLICATIONS

Svensson, Anders; New API Style Output, Easier Import Options, and More; paligo; Dated: Aug. 8, 2017.
An end-to-end CCMS solution for all your documentation needs; paligo; Date: Unknown; Date Downloaded: May 11, 2021.

* cited by examiner

*Primary Examiner* — S. Sough
*Assistant Examiner* — Stephen D Berman
(74) *Attorney, Agent, or Firm* — Fountainhead Law Group P.C.

(57) ABSTRACT

Computer-readable media, methods, and systems are disclosed for producing updated software documentation for a software product. A plurality of versioned source code change indications are received corresponding to changes in a plurality of source code files, which are associated with a target version of the software product. A plurality of documentation sources and associated documentation metadata is received corresponding to the plurality of versioned source code change indications. The plurality of documentation sources is merged based on the plurality of versioned source code change indications and the target version of the software product. Based on determining a set of impacted software documentation outputs, a current version of documentation build tools is fetched based on the merged plurality of merged documentation sources. Software documentation output components are built with the current version of documentation build tools. Finally, the software documentation output components are published to a primary container store.

20 Claims, 7 Drawing Sheets

INTELLIGENT PLATFORM FOR DOCUMENTATION AUTHORING AND PRODUCTION

BACKGROUND

1. Field

Embodiments of the present teachings relate to continuous documentation authoring, publishing, and delivery. More specifically, embodiments relate to employing an end-to-end content management platform to allow documentation authors and technical writers to intelligently author, build, and publish documentation utilizing continuous integration and continuous delivery principles.

2. Related Art

Product documentation has become a critical support element for successfully adopting products and services in a global environment. This is especially true in the case of software documentation, given the transition of many software products and service offerings to the cloud in the context of the accelerated release cycles characteristic of cloud applications.

Software documentation has several requirements. It must guide a user through the entire deployment cycle (installation, operation, use, etc.) of a product or service according to the software's mode of consumption (e.g., "on-premise," "public cloud," "private cloud," or "hybrid"). The software documentation should be available in an appropriate format, language, and available in a proper delivery channel. Finally, the documentation must evolve at least at the same rate as the product or service it serves as a reference for (e.g., must conform to software development practices such as agile development, continuous integration/continuous deployment (CI/CD) practices). Currently, companies define their internal processes and infrastructure to produce and customize documentation. However, each company must adapt to the multiplication of documentation source content to an increasing variety of customized output formats and their ecosystem of delivery channels. This leads to high-cost requirements of documentation development and operations capacity to continuously enhance and maintain processes and infrastructure when dealing with large amounts of documentation. What is needed are systems and methods that provide an end-to-end platform to manage an automated, customizable, and highly scalable pipeline for documentation production.

SUMMARY

Embodiments described herein allow users to utilize an intelligent and end-to-end (e.g., authoring, building, and producing) documentation authoring platform to produce documentation according to CI/CD principles used in agile software development. Various embodiments are directed to documentation platforms comprising a method of producing updated software documentation for a software product, the method comprising: detecting one or more changes in one or more software documentation source items, receiving the one or more documentation source items and associated documentation metadata, merging the plurality of documentation sources items based on the one or more changes, based on determining a set of impacted software documentation outputs, fetching a current version of documentation build tools based on the merged plurality of merged documentation source items, building software documentation output components with the current version of documentation build tools, and publishing the software documentation output components to an output documentation destination.

The end-to-end platform disclosed herein brings together the elements of a classical content management system, documentation building tools, supporting powerful documentation standards such as the Darwin Information Typing Architecture (DITA) XML standard, the DITA Open Toolkit, and a content management system. Using a document authoring language such as DITA to author documentation source code files facilitates efficient authoring of common topics to be integrated into various sets of product documentation.

The disclosed platform includes an intelligent documentation production chain. The end-to-end production chain includes the ability only to re-build and publish deliverables impacted by a documentation source code change input by one or more documentation authors. This documentation production chain also has the ability to dynamically inject data queries into the documentation source code to enable dynamic building of associated documentation outputs and associated publication to an output documentation destination.

CI/CD principles are applied to documentation production throughout the platform. The end-to-end pipeline is fully automated, including steps of fetching documentation source code and tools, building the consumable documentation, and publishing the documentation to the proper channels. The automation allows for continuous documentation production cycles. These principles, as applied, allow for a shortened and more manageable pipeline starting from the source code changes to consumable documentation production. The increased automation in the pipeline relies on integrated load-balancing capabilities to scale elastically to support a large volume of both documentation and users. The load-balancing is optimized to ensure cost efficiency and economy of scale for optimized production resources.

In one embodiment, the primary container store is external to a content management system. In one embodiment, the primary container store is a content management system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

Figure 1:
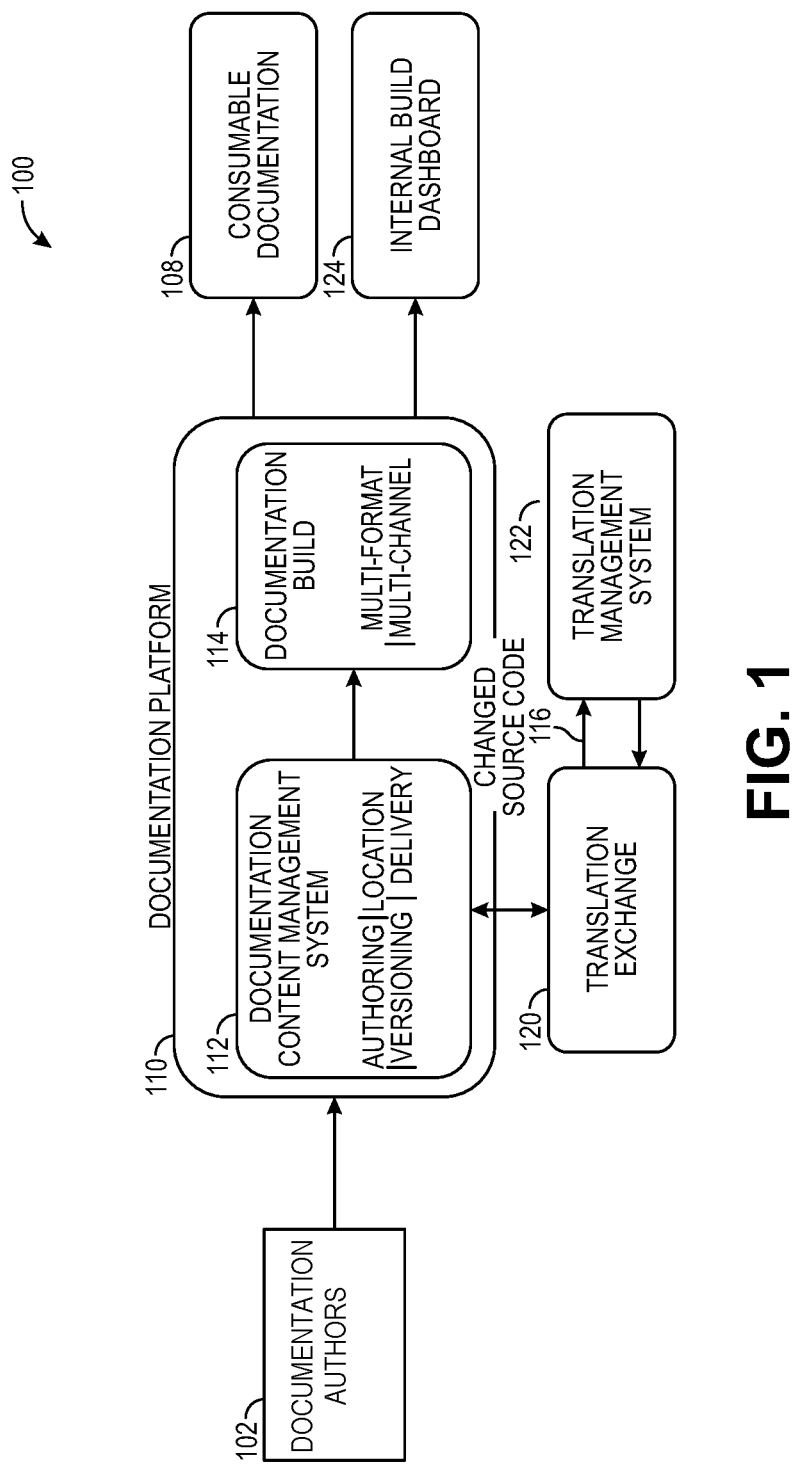
FIG. 1 depicts an exemplary system diagram illustrating documentation authoring input, a software platform, and resulting consumable documentation.

The drawing figures do not limit the claimed scope to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the invention(s) herein described. Other embodiments can be utilized, and changes can be made without departing from the claimed scope. The following detailed description is, therefore, not to be taken in a limiting sense. The claimed invention(s) scope is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, embodiments of the invention can include a variety of combinations and/or integrations of the embodiments described herein.

Generally, embodiments may be directed to systems, computerized methods, or computer programs for authoring, producing, and publishing documentation. The end-to-end platform uses continuous integration and continuous development principles to enable technical writers to author, build, and publish product documentation through a content management system. Example embodiments presented herein produce documentation conforming to the DITA standard. However, other documentation authoring source code standards may be substituted without changing the operation of the embodiments described herein.

FIG. 1 depicts an exemplary flow chart describing documentation source code input, a software platform, and resulting consumable documentation. Documentation authors 102 and localization authors 104, from various locations around the world, input changes to documentation source code 106, corresponding to consumable documentation 108 changes. These changes are input into a documentation platform 110, which includes a content management system 112 and mechanisms for performing a documentation build process 114. In various embodiments, the content management system 112 is compatible with the DITA standard. It is understood that any number of content management systems 112 and associated documentation source code authoring and editing software are contemplated to be employed in connection with the present teachings.

In various embodiments, documentation platform 110 includes the ability to selectively publish parts of consumable documentation 108 corresponding to the needs of an end-user through activation or deactivation of feature flags within associated documentation source code metadata. The feature flags allow for more efficient production and customization of the consumable documentation 108 because build resources are not used to build features that are not required by a particular end-user or for a particular product or product variant requiring product documentation.

Newly created or updated documentation source code from documentation authors 102 and localization authors 104 are optionally exchanged with a translation exchange 120 to a translation management system 122, which accepts the changed source code and exports translated source code to translation exchange 120, which sends the translated source code 118 back to the content management system 112. The content management system 112 and translation management system 122 are integrated, and changes to the documentation source code 106 are automatically translated upon source code submission from one or more documentation authors 102. However, it is contemplated that the translation management system 122 and the content management system may not be integrated and may be wholly separate processes, which integration may or may not be automated.

Translated source code 118 is then transferred to a documentation build process 114, which calculates affected consumable documentation 108 to generate. Only consumable documentation 108 impacted by changes to documentation source code 106 is generated by the build process 114. The documentation platform 110 then publishes consumable documentation 108 to preset channels and an internal build dashboard 124. In some embodiments, the software channels may include GitHub, Nexus, Perforce, or other channels. The consumable documentation can include publishing to an Internet website, Portable Document Format (PDF), or other publishing file formats in certain embodiments.

Figure 2:
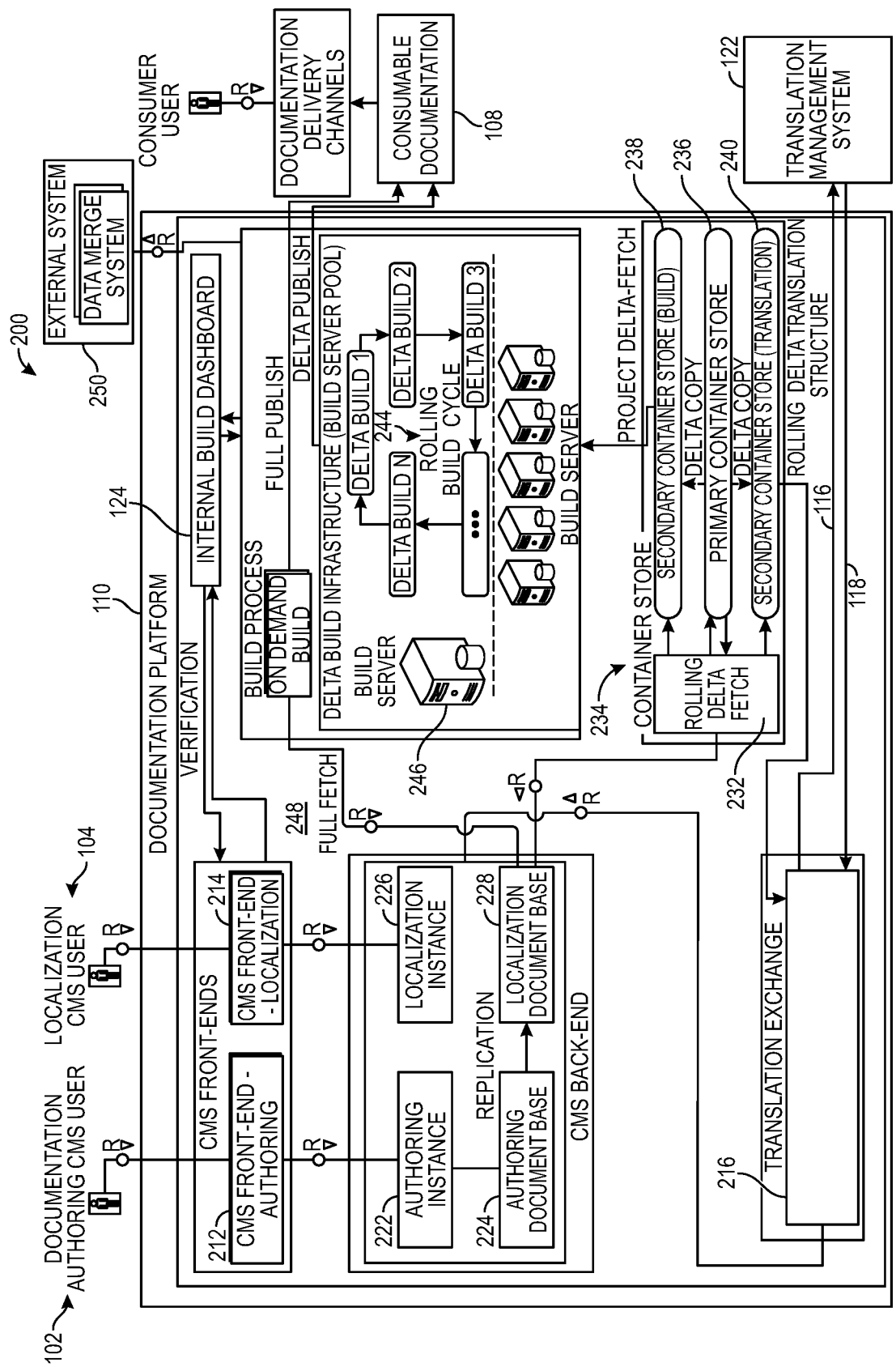
FIG. 2 depicts an exemplary process diagram depicting an end-to-end master pipeline of processing occurring on a documentation platform according to an embodiment.

FIG. 2 depicts an exemplary process depicting an end-to-end master pipeline 202 of steps occurring on a documentation platform 110 according to an embodiment. The pipeline reflects the three stages of consumable documentation 108 production: authoring, building, and publishing. Author-created or updated documentation source code is saved in a CMS back-end, and optionally provided to a translation exchange, where source code changes and localized source code may be persisted with associated metadata in a content management system in connection with an optional round trip natural-language translation process. In some embodiments, branch management necessary in connection with an author maintaining documentation source code is performed in connection with the content management system 112.

Consumable documentation 108 building takes is performed in connection with delta fetch and delta build as further described below in connection with FIGS. 3A and 3B respectively. In some embodiments, documentation platform 110 intelligently scans input documentation source code and changes, building only consumable documentation 108 that is impacted by source code changes (or deltas). This automated building process consumes the source code from the content management system 112 and builds consumable documentation 108. Finally, pipeline 202 publishes the consumable documentation 108, including publishing build results and other information to an internal build dashboard 124.

The preferred embodiment follows pipeline 202 as described in FIG. 2. However, it is contemplated that the ordering of steps may be interchanged, steps eliminated, or added within the pipeline 202, or automated processes made manual to tailor authoring, building, or publishing needs of any producer of consumable documentation 108 or any end-user of the consumable documentation 108.

Documentation authors 102 and localization authors 104 provide changes to the source code. In some embodiments, these changes are persisted to a content management system front-end, further comprising an authoring front-end 212 and localization front-end 214. In other embodiments, it is contemplated that the documentation source code may be edited in connection with various types of documentation editing software, such as a word processor or an integrated development environment. In these embodiments, edits to the documentation source code correlate to edits made to standard metadata tags found in the DITA standard, such as a topic, image, sub-map, project map, project, or other metadata types as found necessary. This list is not intended to limit the types of metadata provided by documentation authors to the content management system 112.

Various embodiments conform to the DITA standard throughout the documentation authoring pipeline. In some such embodiments, standard types of metadata found in the DITA standard are used when authoring and creating build instructions. In some embodiments, at the highest metadata level is the project, which corresponds to a shipped and delivered release to an end-user and is a complete set of product documentation.

Below the project is the project map and the container map. The project map manages the build and publishing configuration of the project (e.g., global settings, languages, etc.) with the list of outputs to produce and where to publish them. The container map manages the documentation set with its versioning. Below the project map and container map is the output. The output manages a deliverable with its individual settings (language, format, delivery channels, profiling, rendering settings, etc.). Each output references a buildable map as the root node for the source content to build. The output file manages each output produced per language and its push to predefined publishing channels.

A buildable map, referenced by the output, manages the content to build and translate. It can be composed of sub-maps, topics, and images. A sub-map manages a smaller unit of content (e.g., feature, sub-system, etc.) within a buildable map. Standard DITA objects that are managed by the sub-map include but are not limited to a topic element, a single piece of information that stands alone, and an image element, which hosts a graphic or artwork.

Documentation authors 102 and the localization authors 104 input the changes in source code into content management system authoring front-end 212 or localization front-end 214. The content management system front-end submissions are managed in the content management system back-end 220. The content management system back-end 220 contains an authoring instance 222 for hosting the authoring document base 224 and a localization instance 226 hosting a localization document base 228, which further hosts a copy of the content within the authoring document base 224, and localized content which is updated from the translation management system 122 via the translation exchange 216. In the localization instance 226, the copy of the authoring document base is replicated automatically when one or more documentation authors 102 submit changes to documentation source code 106 to the content management system back-end 220.

In this embodiment, the content management system 112 includes multiple instances for documentation authors 102 and localization authors 104, including document bases for each separate user. However, it is contemplated that the content management system 112 may or may not include multiple instances for other uses or other front-end users. Additionally, it is contemplated that the content management system 112 may or may not include separate document bases as described in the preferred embodiment. The bases may be combined, further separated, hosted within the content management system 112, outside of the content management system 112, or another combination.

Figure 3A:
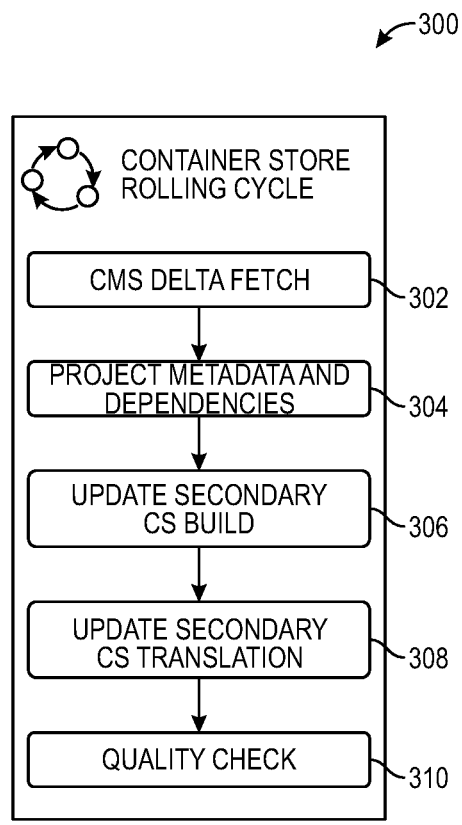
FIG. 3A depicts an exemplary diagram corresponding to a delta fetch process utilized in an embodiment.

Following source code localization, a delta fetch process, further elaborated in FIG. 3A, obtains changed localized documentation source code files and copies them to a container store infrastructure 234. The container store infrastructure 234 exports changed source code 116 within the container source infrastructure 234 to the translation exchange 216, then to the translation management system 122. In some embodiments, the container store infrastructure 234 contains a primary container store 236, secondary container store 238, and secondary container store 240. Secondary container store 238 is built for further consumption by delta build process 350. Secondary container store 240 is built for further consumption by the translation management system 122.

In various embodiments, the container store infrastructure 234 exports build instructions containing a map of the individual data files that together will comprise the consumable documentation 108 and the source code 116 that has not yet been translated. In these embodiments, the translation management system 122 imports the files through the translation exchange 216 and then translates the files. Following translation, the translation management system 122 exports the translated source code 118 through the translation exchange 216 to the content management system 112, which imports the files associated with the translated source code 118 for use in delta build process 350.

In some embodiments, delta build process 350 is employed to build only the parts of the documentation that need to be rebuilt due to input changes. Delta build process 350 is further described in connection with FIG. 3B. Delta build process 350 detects changed source code files. The detected changed source code files are assigned to a build server 246 designed to process the build. The server 246 compiles only changed source code files after calculating any affected outputs (e.g., consumable documentation 108). The build process pushes output consumable documentation 108 to predefined delivery channels (e.g., GitHub, Nexus, Perforce, or others) and an internal build dashboard 124.

As an alternative to the delta fetch process 300 and delta build process 350, the platform may execute a full fetch 248 containing all source code. The process associated with a full fetch 248 obtains data from the content management system back-end 220 localization document base 228 and publishes all consumable documentation 108, not only changed content within documentation source code 106.

FIG. 3A depicts an exemplary diagram corresponding to a delta fetch process 300 utilized in an embodiment. The delta fetch process 300 prepares changed documentation source code to be built in delta mode, further described in FIG. 3B. First, at step 302, a CMS delta fetch process obtains changed localized source code files. These source code files are stored, with link resolution, to the container store infrastructure, specifically in the primary container store 236.

At step 304, the delta fetch process creates the project metadata necessary for the delta build process. In this embodiment, the metadata is created within the primary container store 236. However, it is contemplated that the metadata is created elsewhere during the fetch process. First, the delta fetch process assesses the metadata within the content management system 112. This content management system 112 metadata corresponds to metadata to be created during the delta fetch process. In this embodiment, the project, project map, output, and output file directly correlate to the DITA build metadata types of project build, project makefile, build unit, and binary, respectively. It is contemplated that the types and metadata correlations between the content management system 112 and the metadata needed by the delta fetch process may differ by requiring more or fewer metadata types or different correlations between existing metadata types.

The project build, created using the project in the content management system 112 metadata, is a record of each active content management system 112 project, its project build, build revisions, and scheduling information. The project makefile, created using the project map in the content management system 112 metadata, exists to transform DITA source content into binaries (outputs). The build unit, created using the output in the content management system 112 metadata, consists of an output per language, which is the smallest build unit running during the build. Build units are multi-threaded so that they can run in parallel during the compilation step for better performance. The binary, created using the output file in the content management system 112 metadata, is the branded output produced during the build and published automatically to predefined channels.

In some embodiments, the delta fetch process updates secondary container store 238 and secondary container store 240. The data update consists of the data within the primary container store 236 copied to secondary container stores 238 and secondary container stores 240. Step 308 copies the data for the secondary container store 238 built for further consumption by the delta build process 350. Step 310 copies the data from the primary container store 236 to the secondary container store 240, built for further consumption by the translation management system 122. The final step 312 in the delta fetch process 300 is a quality check. In some embodiments, the quality check ensures consistency between various instances of the data within various data stores. For example, in the case of a network partition during one of the above copying steps, documentation source code contents may have been truncated or otherwise corrupted, which would be detected by way of the quality check. In some embodiments, upon detection of inconsistent data, for example, between the CMS and the primary container store or between the primary container store and one of secondary container store 238 and secondary container store 240, a new copying process may be initiated. In some other embodiments a delta copy may be performed in which only a segment with an inconsistency is detected and recopied.

Figure 3B:
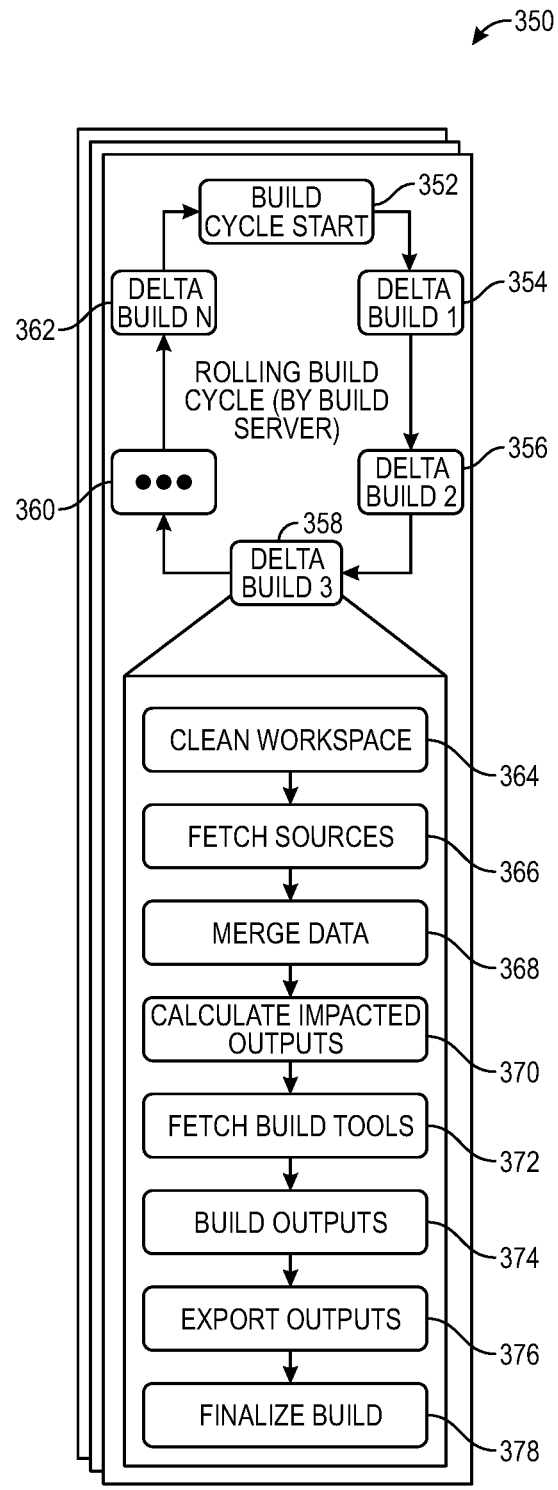
FIG. 3B depicts an exemplary diagram corresponding to a delta build process utilized in an embodiment.

FIG. 3B depicts an exemplary diagram corresponding to a delta build process 350 utilized in an embodiment. The delta build process 350 build framework, outlined in FIG. 3A, serves as a sub-pipeline within an overall larger pipeline. The delta build process 350 occurs on a build server 246, and there may be several build servers 246 each performing a delta build process 300. A build server 246 performs delta builds 244 on a rolling basis. Each time delta build process 350 completes a build, the build server 246 will begin another delta build when new changes are available.

In some embodiments, delta build process 350 on a build server 246 begins at step 364 by cleaning all locally produced files from any previous delta build left on the build server 246. Next, at step 366, the build server 246 fetches source content from the secondary container store for build process consumption. The process checks the source code files to ensure translation. In some embodiments, if the source code files are not translated, a fallback language (United States English) copy of the source code files is fetched.

The source code files can include author-entered queries to external data merge servers. At step 368, these queries are executed, and the results of the queries are merged into the source code. For example, one or more documentation authors 102 may place a table in the source code (e.g., into a DITA Topic file). Instead of manually filling out the data in the table, which is subject to change, the one or more documentation authors 102 may instead place a data query in a cell. In this embodiment, at this step 368, the query is processed. The data obtained from the query results are automatically injected into an intermediary documentation source code file, requiring no manual input from the one or more documentation authors 102.

At step 370, delta build process 350 calculates the list of deliverables that should be built. In this embodiment, a rules-based algorithm scans the source code files and any metadata to determine if any changes are present. If changes are detected, the deliverable (e.g., consumable documentation 108) is rebuilt. In this embodiment, the documentation source code is scanned according to rules that determine whether any consumable documentation 108 will be affected. If so, the documentation source code is slated to be compiled.

Rules used in scanning documentation source code include but are not limited to examining whether any authoring or translated content has changed in a way that impacts outputs, changes in the data that is merged in the data merge step 368, any changes to the project map that impacts outputs (e.g., a changed attribute, such as the final rendering), or other rules not listed here.

Additionally, during step 370, the documentation source code is examined to determine the status of any feature flags. This, combined with the rules-based scanning, are the intelligent optimization of the delta build process 350. In some embodiments, a feature flag that is enabled with corresponding changes in one or more documentation source code files will be built, and those feature flags not active will not cause corresponding documentation source code files to be part of the build process.

At step 372, the build server 246 fetches and imports tools used during the build. In this embodiment, the DITA Open Toolkit is used as the publishing engine. However, it is contemplated that many other toolkits and engines may be interchanged and used instead of the DITA Open Toolkit. Here, the DITA Open Toolkit is used to create branded outputs from documentation source code 106 that conforms to the DITA standard.

At step 374, the delta build process runs parallel compilation of an output by simultaneously compiling the deliverable and transforming the metadata of a deliverable to properties and using the build tools to produce branded outputs. Each output is produced one language at a time. In this embodiment, during the compilation of an output, the output configuration information defined in the project map is transformed into properties and passed to DITA Open Toolkit tools to produce the branded outputs. Additionally, in this embodiment, an abstraction layer on top of DITA Output Toolkit tools allows for the creation of various output formats with their customizable properties exposed through the Project Map Editor, based on the zero-code principle allowing output channels and formats to be defined with configuration, requiring no additional software development to configure various deployments of built documentation sets.

At step 376, the finished consumable documentation 108 is published to the predefined channels in the source code metadata. Finally, at step 328, the delta build process runs the final reporting steps and updates the internal build dashboard 124. It is contemplated that parts of the delta build process 350 sub-pipeline may require additional or fewer steps than outlined in FIG. 3B. However, edits of the sub-pipeline steps that do not interfere with the intelligent building process and are not listed here are contemplated.

The documentation platform 110 includes the ability to scale elastically and includes features throughout the pipeline 202 from authoring, building, and publishing to accomplish this. In the authoring stage, the document base split containing the authoring document base 224 and the localization base 228 to host one base only for authoring documentation and one base only for localization and production. The key benefit of this architecture is to ensure that authors working in the authoring instance are not impacted by the build and translation processes running on the localization instance. In addition, this supports the performance of the content management system 112 while running build and translation processes.

Running the documentation platform 110 in delta mode, by changing only impacted consumable documentation 108, supports production scalability through making the documentation platform 110 intelligent. This is achieved through scanning the documentation source code 106 according to rules defined in the documentation platform 110 to determine what changes are made to the documentation source code 106 and what consumable documentation 108 needs to be rebuilt. In this embodiment, the delta mode architecture consists of delta fetch process 300, including the delta fetch from the content management system 112 to the container store infrastructure 234, delta copying from the primary container store 236 to secondary container store 238 and secondary container store 240, and delta build process 350 through fetching 316, delta compilation in building 324, and delta publishing in steps 326 and 328.

Pipeline 202 utilizes load-balancing. This is enabled through implementing intelligent algorithms which automatically load-balance based on the project size (e.g., number of source files and deliverables, etc.), server resources (e.g., available CPU, RAM, hard drive speed, etc.), and server load (e.g., average build cycle duration). This allows for better distribution of builds to available build servers 246 and optimal usage of build resources with reduced total cost of ownership (TCO).

The last scaling feature in pipeline 202 is the inclusion of a ticket-free platform. The documentation platform 110 empowers expert users to perform various advanced operations on the documentation platform 110 through self-service applications. In this embodiment, this may include, but is not limited to creating/updating content management system 112 users and roles, managing build assignments, creating new DITA profiling attributes/values, configuring the data merge service 250, etc. This inclusion and available expert customization reduces support efforts to a minimum.

Figure 4:
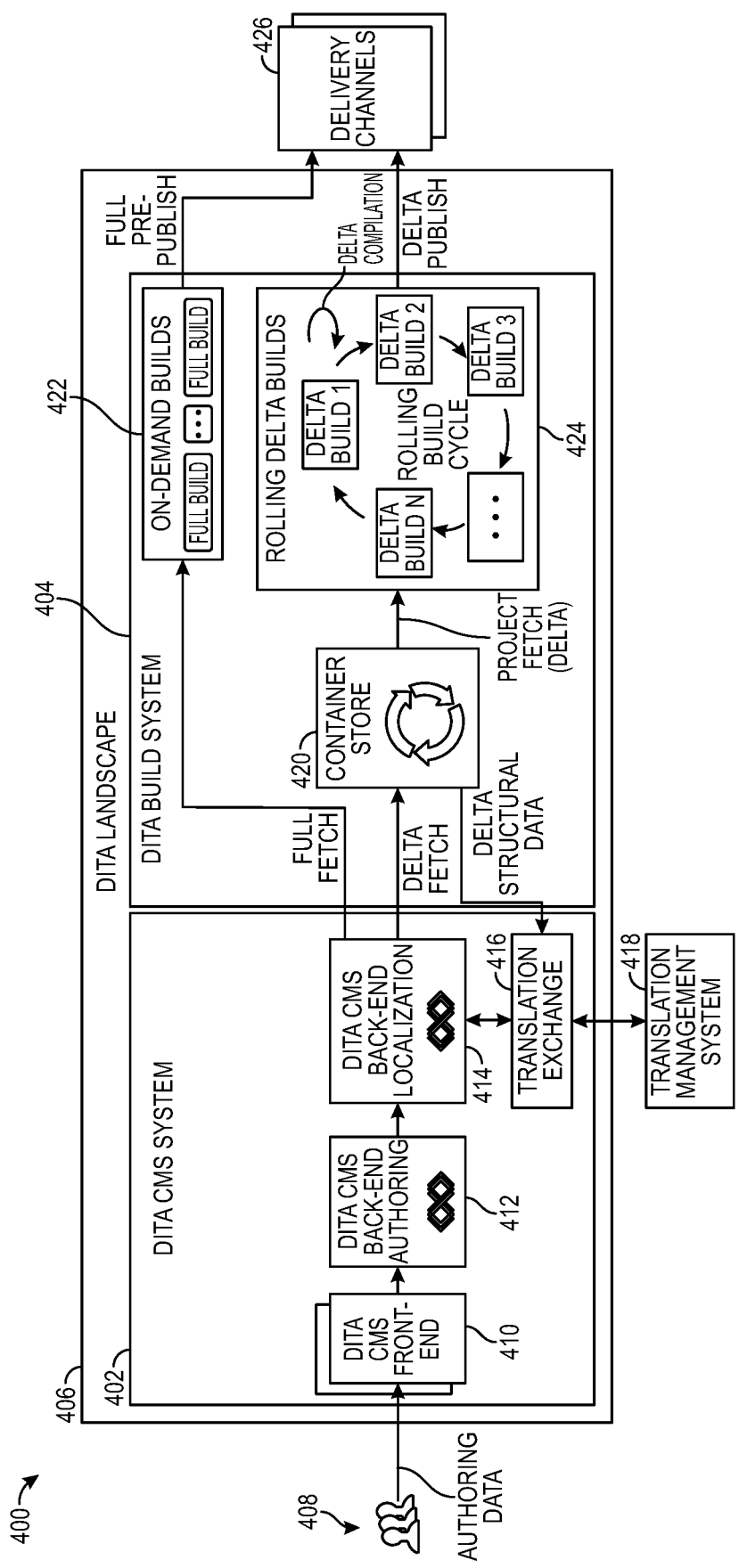
FIG. 4 depicts an exemplary system diagram illustrating a documentation production platform according to an embodiment.

FIG. 4 depicts an exemplary system diagram 400 illustrating a documentation production platform according to an embodiment. In some embodiments, a rolling delta build model has the following benefits. Typically, the platform will build only those documentation outputs that will change based on input documentation source code files. This results in faster builds as well as multiple build cycles per day, which provides faster validation and delivery of documentation. Similarly, this means that only changed outputs need to be published, resulting in significant load reduction to delivery channels. This enables optimization of hardware and build resources resulting in significant TCO reduction and associated costs savings over complete documentation rebuilds.

On-demand documentation builds may be implemented as an alternative, push-button self-service for DITA CMS end-users available directly from the CMS. From an architectural standpoint, a rolling delta build is provided. A first exception is fetching DITA source content from the CMS (Localization document base) in full mode, instead of the container store in delta mode. A second exception relates to running compilation and publishing in full mode, instead of delta mode, which has the benefit of providing a complete new set of published documentation without needing to wait for a delta build cycle.

In some embodiments, DITA CMS system 402 receives authoring data 408. Authoring data 408 is received at DITA CMS front-end 410. From here, DITA CMS back-end authoring module 412 is employed to scan documentation source code files to identify changes. Optionally, DITA CMS back-end localization module 414 may be employed to provide natural-language translation functionality. In some embodiments, this translation function is accomplished at translation exchange 416, which optionally employs translation management system 418.

DITA build system 404 is employed to build DITA sources into documentation outputs to be provided to various delivery channels 426. In some embodiments a delta fetch is performed to fetch deltas into container store 420. From here rolling delta builds 424 are executed to provide delta published documentation to delivery channels 426. In an alternative embodiment, a full fetch is performed in connection with on-demand builds 422.

Figure 5:
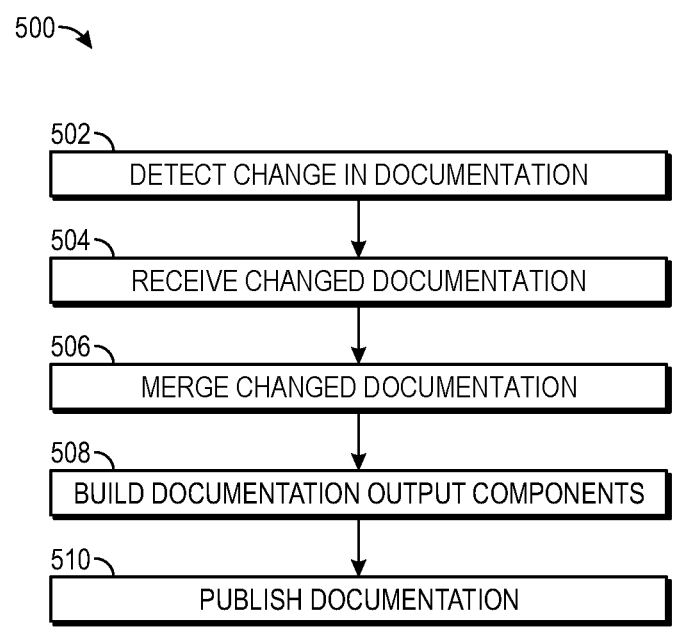
FIG. 5 depicts an exemplary flow chart corresponding to an embodiment.

FIG. 5 depicts an exemplary flow chart 500 corresponding to an embodiment. In various embodiments, flow chart 500 performs a method of producing updated software documentation for a software product. At step 502, one or more changes in one or more software documentation source items is detected. In some such embodiments, the one or more documentation source items and associated documentation metadata is received. At step 504, the one or more documentation source items is received in connection with a content management system supporting DITA file format.

At step 506, the plurality of documentation sources items is merged based on the one or more changes. Based on determining a set of impacted software documentation outputs, a current version of documentation build is fetched tools based on the merged plurality of merged documentation source items (step 506). At step 508, software documentation output components are built with the current version of documentation build tools. Finally, the software documentation output components are published to a primary container store (step 510).

Figure 6:
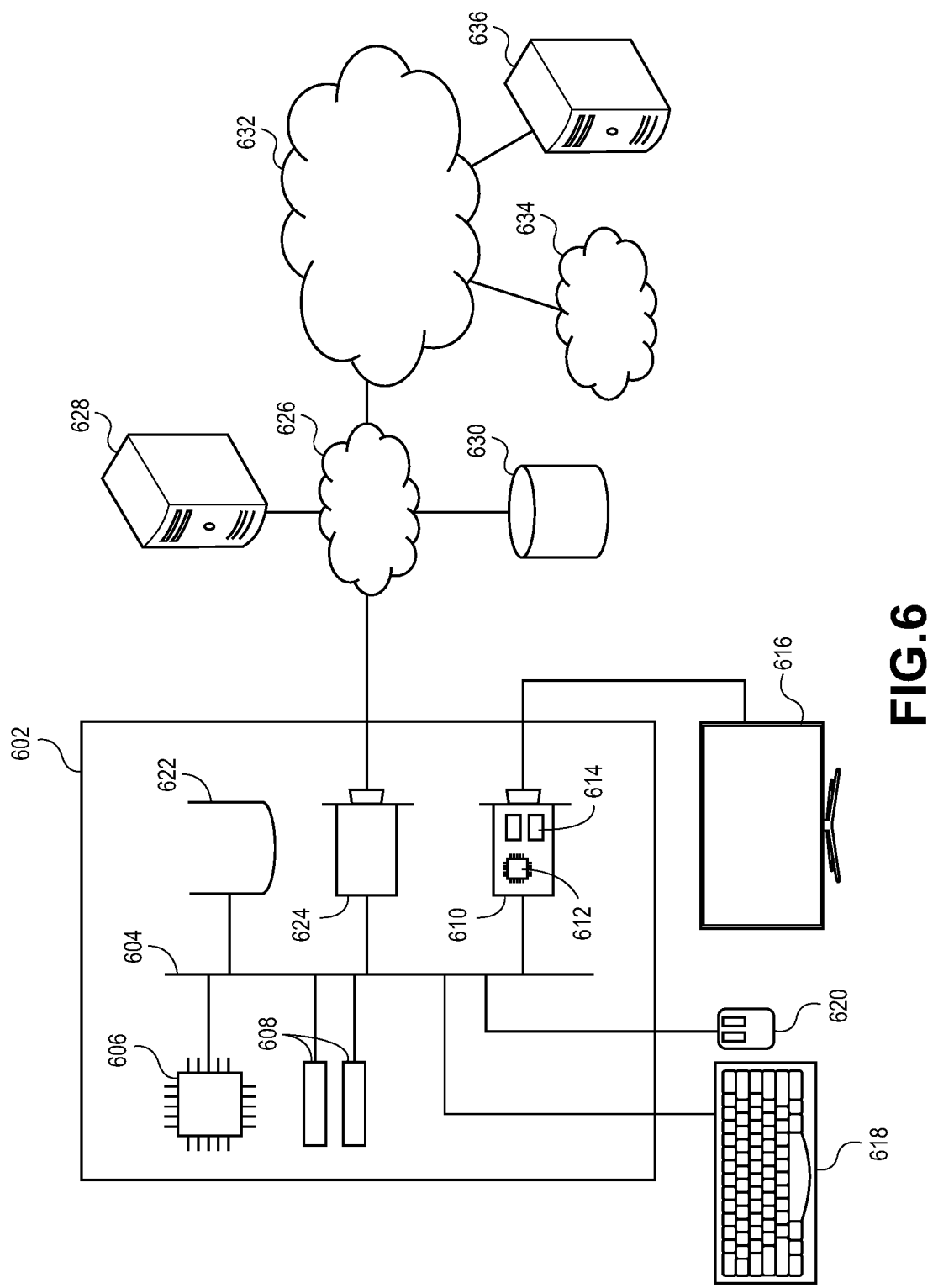
FIG. 6 depicts an exemplary hardware platform for embodiments.

FIG. 6 depicts an exemplary hardware platform that can form one element of certain embodiments of the invention. Computer 602 can be a desktop computer, a laptop computer, a server computer, a mobile device such as a smartphone or tablet, or any other form factor of general- or special-purpose computing device. Depicted with computer 602 are several components for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components that may communicate with each other directly.

Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card but rather may be integrated into the motherboard or the CPU 606. In some embodiments, graphics card 610 has a separate graphics-processing unit (GPU) 612, which can be used for graphics processing or general-purpose computing (GPGPU). Also on graphics card 610 is GPU memory 614. Connected (directly or indirectly) to graphics card 610 is displayed for user interaction. In some embodiments, no display is present, while in others, it is integrated into computer 602.

Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical but transitory forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein, such as backup or versioning. Datastores can be local to a single computer such as computer 628, accessible on a local network such as local network 626, or remotely accessible over Internet 632. Local network 626 is connected to Internet 632, which connects many networks such as local network 626, remote network 634, or directly attached computers such as computer 636. In some embodiments, computer 602 can itself be directly connected to Internet 632.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of producing updated software documentation for a software product, the method comprising:
   detecting one or more changes in one or more software documentation source items;
   receiving the one or more documentation source items and associated documentation metadata;
   merging, into a primary container store, the one or more documentation source items based on the one or more changes;
   executing one or more queries contained within at least one query-containing document in the one or more documentation source items;
   exporting contents associated with the primary container store to one or more secondary container stores during a first process;
   in response to detecting an inconsistency between the primary container store and at least one of the one or more secondary container stores of the first process, exporting the contents associated with the primary container store to the one or more secondary container stores during at least a second process,
   wherein the one or more secondary container stores include:
      a delta build container store having a first set of inputs to one or more documentation delta build processes; and
      a document localization container store having a second set of inputs to one or more documentation localization processes;
   building software documentation output components with a current version of documentation build tools; and
   publishing the software documentation output components to an output documentation destination.

2. The method of claim 1, wherein the associated documentation metadata includes at least a project manifest and a plurality of project dependencies.

3. The method of claim 2, wherein the current version of documentation build tools is executed according to the project manifest.

4. The method of claim 1, further comprising:
   updating localization contents associated with the document localization container store by performing natural language translation on contents identified for translation; and
   exporting the updated localization contents to one or more content management systems.

5. The method of claim 1, wherein the primary container store is a content management system.

6. The method of claim 1, wherein the software documentation output components are automatically built based on detecting a change in the associated documentation metadata.

7. The method of claim 1, wherein the building of the software documentation output components is further based on the set of impacted software documentation outputs.

8. One or more non-transitory computer-readable media storing computer-executable instructions that, when executed by a processor, perform a method of producing updated software documentation for a software product, the method comprising:
    detecting one or more changes in one or more software documentation source items;
    receiving the one or more documentation source items and associated documentation metadata;
    merging, into a primary container store, the one or more documentation source items based on the one or more changes and one or more queries contained within at least one query-containing document in the one or more documentation source items;
    exporting contents associated with the primary container store to one or more secondary container stores during a first process;
    in response to detecting an inconsistency between the primary container store and at least one of the one or more secondary container stores of the first process, exporting the contents associated with the primary container store to the one or more secondary container stores during at least a second process, wherein the one or more secondary container stores include:
        a delta build container store having a first set of inputs to one or more documentation delta build processes; and
        a document localization container store having a second set of inputs to one or more documentation localization processes;
    based on determining a set of impacted software documentation outputs, fetching a current version of documentation build tools based on the merged one or more documentation source items;
    building software documentation output components with the current version of the documentation build tools; and
    publishing the software documentation output components to an output documentation destination.

9. The one or more non-transitory computer-readable media of claim 8, wherein the associated documentation metadata includes at least a project manifest and a plurality of project dependencies.

10. The one or more non-transitory computer-readable media of claim 9, wherein the current version of documentation build tools is executed according to the project manifest.

11. The one or more non-transitory computer-readable media of claim 8, the method further comprising:
    updating localization contents associated with the document localization container store by performing natural language translation on contents identified for translation; and
    exporting the updated localization contents to one or more content management systems.

12. The one or more non-transitory computer-readable media of claim 8, wherein the primary container store is external to a content management system.

13. The one or more non-transitory computer-readable media of claim 8, wherein the software documentation output components are automatically built based on detecting a change in the associated documentation metadata.

14. The one or more non-transitory computer-readable media of claim 8, wherein the building of the software documentation output components is further based on the set of impacted software documentation outputs.

15. A system comprising at least one processor and at least one non-transitory memory storing computer executable instructions that when executed by the processor cause the system to carry out actions comprising:
    detecting one or more changes in one or more software documentation source items;
    receiving the one or more documentation source items and associated documentation metadata;
    executing one or more queries contained within at least one query-containing document in the one or more documentation source items to generate one or more documentation query results;
    merging, into a primary container store, the one or more documentation source items based on the one or more changes and the one or more documentation query results;
    exporting contents associated with the primary container store to one or more secondary container stores during a first process;
    in response to detecting an inconsistency between the primary container store and at least one of the one or more secondary container stores of the first process, exporting the contents associated with the primary container store to the one or more secondary container stores during at least a second process,
    wherein the one or more secondary container stores include:
        a delta build container store having a first set of inputs to one or more documentation delta build processes; and
        a document localization container store having a second set of inputs to one or more documentation localization processes;
    based on determining a set of impacted software documentation outputs, fetching a current version of documentation build tools based on the merged one or more documentation source items;
    building software documentation output components with the current version of documentation build tools; and
    publishing the software documentation output components to an output documentation destination.

16. The system of claim 15, wherein the associated documentation metadata includes at least a project manifest and a plurality of project dependencies.

17. The system of claim 16, wherein the current version of documentation build tools is executed according to the project manifest.

18. The system of claim 15, wherein the actions further comprise:
    updating localization contents associated with the document localization container store by performing natural language translation on contents identified for translation; and
    exporting the updated localization contents to one or more content management systems.

19. The system of claim 15, wherein the primary container store is a content management system.

20. The system of claim 15, wherein the building of the software documentation output components is further based on the set of impacted software documentation outputs.

* * * * *